(12) United States Patent
Bainville et al.

(10) Patent No.: US 10,831,488 B1
(45) Date of Patent: Nov. 10, 2020

(54) COMPUTATION ENGINE WITH EXTRACT INSTRUCTIONS TO MINIMIZE MEMORY ACCESS

(71) Applicant: Apple Inc., Cupertino, CA (US)

(72) Inventors: Eric Bainville, Sunnyvale, CA (US);
Jeffry E. Gonion, Campbell, CA (US);
Ali Sazegari, Los Altos, CA (US);
Gerard R. Williams, III, Los Altos, CA (US); Andrew J. Beaumont-Smith, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 16/105,783

(22) Filed: Aug. 20, 2018

(51) Int. Cl.
*G06F 9/30* (2018.01)
*G06F 9/38* (2018.01)
*G06F 9/32* (2018.01)

(52) U.S. Cl.
CPC ............ *G06F 9/322* (2013.01); *G06F 9/3012* (2013.01); *G06F 9/30036* (2013.01); *G06F 9/30138* (2013.01); *G06F 9/3877* (2013.01)

(58) Field of Classification Search
CPC .......................... G06F 9/30032; G06F 9/30036
See application file for complete search history.

(56) References Cited

U.S. PATENT DOCUMENTS

| | | |
|---|---|---|
| 4,719,588 A | 1/1988 | Tatemichi et al. |
| 5,025,407 A | 6/1991 | Gulley et al. |
| 5,852,444 A | 12/1998 | Lippincott |
| 5,903,769 A | 5/1999 | Arya |

(Continued)

FOREIGN PATENT DOCUMENTS

| | | |
|---|---|---|
| CN | 106445471 | 2/2017 |
| EP | 0468820 B1 | 1/1992 |

(Continued)

OTHER PUBLICATIONS

Song Han et al: EIE: Efficient Interence Engine on Compressed Deep Neural Networks, ACM SIGARCH Computer Architecture News, ACM Special Interset Group on Computer Archtecture, 2 Penn Plaza, Suite 701 New York NY 10121-0701 USA, Stanford University, 2016, 12 pages.

(Continued)

*Primary Examiner* — Jacob Petranek
(74) *Attorney, Agent, or Firm* — Kowert, Hood, Munyon, Rankin & Goetzel, P.C.; Lawrence J. Merkel

(57) ABSTRACT

In an embodiment, a computation engine may offload work from a processor (e.g. a CPU) and efficiently perform computations such as those used in LSTM and other workloads at high performance. In an embodiment, the computation engine may perform computations on input vectors from input memories in the computation engine, and may accumulate results in an output memory within the computation engine. The input memories may be loaded with initial vector data from memory, incurring the memory latency that may be associated with reading the operands. Compute instructions may be performed on the operands, generating results in an output memory. One or more extract instructions may be supported to move data from the output memory to the input memory, permitting additional computation on the data in the output memory without moving the results to main memory.

26 Claims, 6 Drawing Sheets

(56) References Cited

U.S. PATENT DOCUMENTS

| | | |
|---|---|---|
| 6,675,187 B1 | 1/2004 | Greenberger |
| 6,901,422 B1 | 5/2005 | Sazegari |
| 6,922,716 B2 | 7/2005 | Desai et al. |
| 6,959,378 B2 | 10/2005 | Nickolls et al. |
| 7,337,205 B2 | 2/2008 | Sazegari |
| 7,668,894 B2 | 2/2010 | Sazegari et al. |
| 7,873,812 B1 | 1/2011 | Mimar |
| 9,235,414 B2 | 1/2016 | Gopal et al. |
| 9,600,281 B2 | 3/2017 | Eichenberger et al. |
| 9,658,986 B2 | 5/2017 | Ge et al. |
| 10,089,278 B2 | 10/2018 | Moskovich et al. |
| 10,346,163 B2 | 7/2019 | Bainville et al. |
| 2003/0188127 A1* | 10/2003 | So .................. G06F 9/3861 712/34 |
| 2003/0221086 A1 | 11/2003 | Simovich et al. |
| 2004/0268094 A1 | 12/2004 | Abdallah et al. |
| 2005/0125631 A1 | 6/2005 | Symes et al. |
| 2005/0203980 A1 | 9/2005 | Harrison et al. |
| 2005/0225562 A1 | 10/2005 | Higgins et al. |
| 2007/0079179 A1* | 4/2007 | Jourdan ............. G06F 9/3001 714/49 |
| 2009/0024685 A1 | 1/2009 | Salama et al. |
| 2009/0100247 A1 | 4/2009 | Moyer et al. |
| 2010/0274990 A1 | 10/2010 | Wilder |
| 2011/0153707 A1 | 6/2011 | Ginzburg et al. |
| 2012/0254591 A1 | 10/2012 | Hughes et al. |
| 2012/0254592 A1* | 10/2012 | San Adrian ......... G06F 9/30018 712/205 |
| 2013/0159665 A1 | 6/2013 | Kashyap |
| 2013/0198495 A1 | 8/2013 | Vick et al. |
| 2014/0019720 A1 | 1/2014 | Sprangle et al. |
| 2014/0229716 A1 | 8/2014 | Gueron et al. |
| 2014/0317388 A1* | 10/2014 | Chung ............... G06F 9/30145 712/229 |
| 2015/0012724 A1 | 1/2015 | Lutz et al. |
| 2017/0031682 A1 | 2/2017 | Eapen et al. |
| 2017/0097884 A1 | 4/2017 | Werner et al. |
| 2017/0102892 A1 | 4/2017 | Pusukuri et al. |
| 2017/0192781 A1 | 7/2017 | Valentine et al. |
| 2018/0032312 A1 | 2/2018 | Hansen et al. |
| 2018/0074824 A1* | 3/2018 | Sazegari ............. G06F 9/30101 |
| 2018/0107630 A1* | 4/2018 | Zhou .................. G06F 9/3001 |
| 2018/0137075 A1 | 5/2018 | Linderman et al. |
| 2018/0321937 A1 | 11/2018 | Brown et al. |
| 2018/0357064 A1* | 12/2018 | Chen .................. G06F 9/3867 |
| 2019/0065150 A1 | 2/2019 | Heddes et al. |
| 2019/0065190 A1 | 2/2019 | Zhang et al. |
| 2019/0079903 A1 | 3/2019 | Dreyer et al. |
| 2019/0102178 A1 | 4/2019 | Zbiciak |

FOREIGN PATENT DOCUMENTS

| | | |
|---|---|---|
| EP | 3051412 A1 | 8/2016 |
| WO | 2017185389 A1 | 11/2017 |

OTHER PUBLICATIONS

ISR/WO, PCT/US2019/042744, dated Oct. 23, 2019, 15 pages.

Shaoli Liu et al., "Cambricon,"ACM Sigarch Computer Architecture News, ACM Special Interest Group on Computer Architecture, 2 Penn Plaza, Suite 701 New York, NY 10121-0701 USA, vol. 44, No. 3, Jun. 18, 2016 (2016-06-180, pp. 393-405, XP058300636, ISSN:0163-5964, DOI: 10:1145/3007787.3001179.

Tang et al., "Table-Lookup Algorithms for Elementary Functions and Their Error Analysis", 1991, pp. 232-236.

Kantabutra, "On Hardware for Computing Exponential and Trigonometric Functions", Mar. 1996, pp. 328-339.

* cited by examiner

| Instruction | Description |
|---|---|
| LoadX Xn | Load X memory from main memory at pointer Xn |
| LoadY Xn | Load Y memory from main memory at pointer Xn |
| LoadZm Xn | Load Zm row from main memory at pointer Xn |
| StoreX Xn | Store X memory to main memory at pointer Xn |
| StoreY Xn | Store Y memory to main memory at pointer Xn |
| StoreZm Xn | Store Zm row to main memory at pointer Xn |
| ExtractZm Xn/Yn | Store Zm row to Xn or Yn. |
| ExtractXm Yn | Store Xm to Yn. |
| ExtractYm Zn | Store Xm to Yn. |
| MAC/FMA/FMS \<size\> \<V/M\> \<X RA\> \<Y RA\> \<Z RA\> | Compute multiplications of X and Y, sum with elements of Z. Size indicates output size. V/M specifies Vector or Matrix (Outer Product) Multiplication. |

COMPUTATION ENGINE WITH EXTRACT INSTRUCTIONS TO MINIMIZE MEMORY ACCESS

BACKGROUND

Technical Field

Embodiments described herein are related to computation engines that assist processors and, more particularly, to computation engines that include extract instructions to minimize memory access.

Description of the Related Art

A variety of workloads being performed in modern computing systems rely on massive numbers of computations on relatively small numbers. For example, certain long short term memory (LSTM) learning algorithms are used in a variety of contexts such as language detection, card readers, natural language processing, handwriting processing, and machine learning, among other things. LSTM processing includes numerous multiplications and accumulations.

General purpose processors (e.g. central processing units, or CPUs), even with vector instructions in the CPU instruction set, tend to exhibit very low performance on the above types of workloads; while the power consumption is very high. Low performance, high power workloads are problematic for any computing system, but are especially problematic for battery-powered systems such as mobile devices.

Additionally, because the data sets are large, frequent memory accesses can occur which consume power and cause considerable latency, which reduces the performance of the over algorithm.

SUMMARY

In an embodiment, a computation engine may offload work from a processor (e.g. a CPU) and efficiently perform computations such as those used in LSTM and other workloads at high performance. In an embodiment, the computation engine may perform computations on input vectors from input memories in the computation engine, and may accumulate results in an output memory within the computation engine. The input memories may be loaded with initial vector data from memory, incurring the memory latency that may be associated with reading the operands. Compute instructions may be performed on the operands, generating results in an output memory. One or more extract instructions may be supported to move data from the output memory to the input memory, permitting additional computation on the data in the output memory without moving the results to main memory. Main memory latency may only be experienced when the results are complete or when additional data is needed from memory, in an embodiment. In an embodiment, if the result data footprint is smaller than the output memory, additional data may be cached in the output memory and moved, via extract instructions, to the input memory for processing.

BRIEF DESCRIPTION OF THE DRAWINGS

The following detailed description makes reference to the accompanying drawings, which are now briefly described.

FIG. 7 is a table of instructions which may be used for one embodiment of the processor and computation engine.

Figure 1:
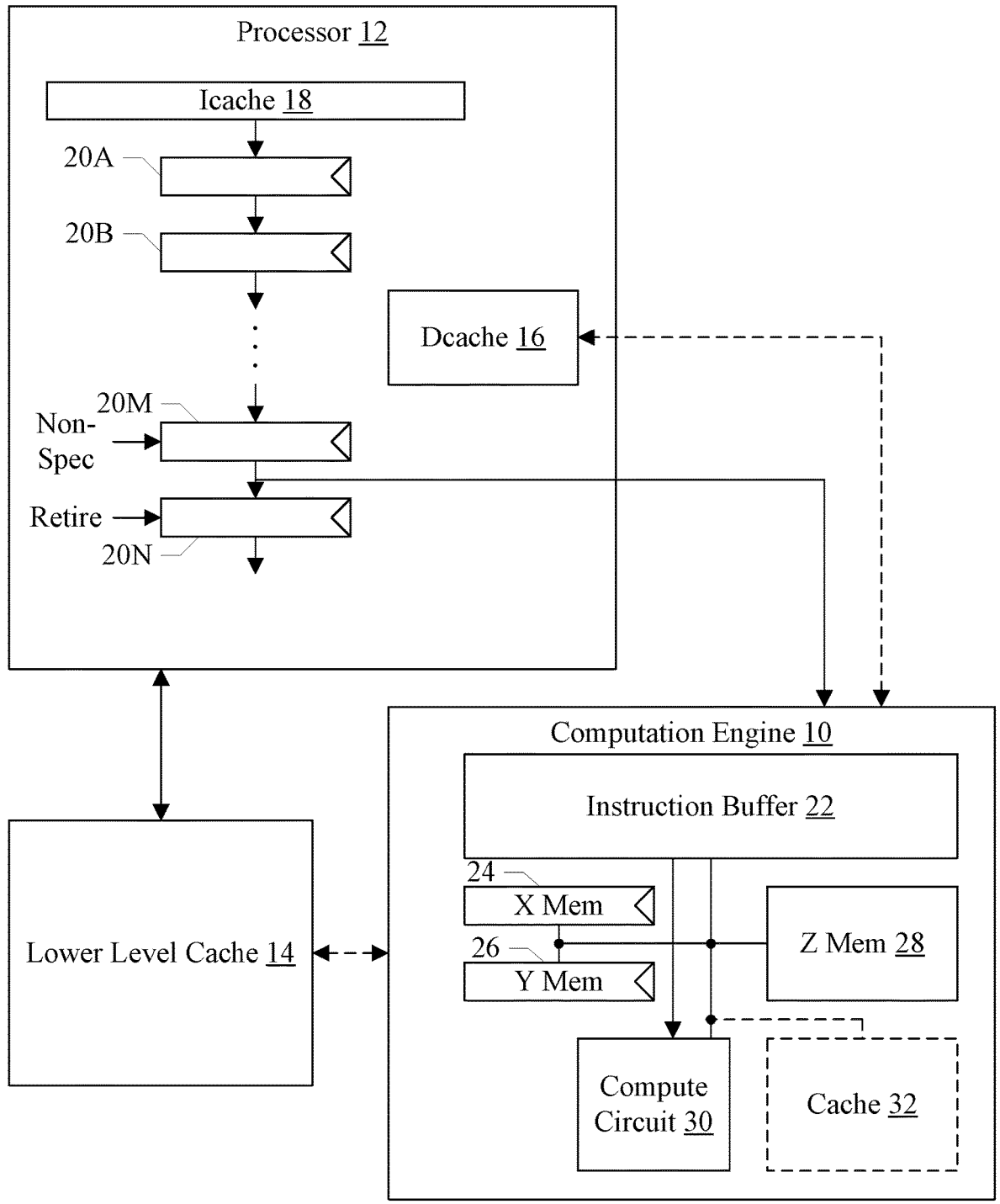
FIG. 1 is a block diagram of one embodiment of a processor, a computation engine, and a lower level cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of an apparatus including a processor 12, a computation engine 10, and a lower level cache 14 is shown. In the illustrated embodiment, the processor 12 is coupled to the lower level cache 14 and the computation engine 10. In some embodiments, the computation engine 10 may be coupled to the lower level cache 14 as well, and/or may be coupled to a data cache (DCache) 16 in the processor 12. The processor 12 may further include an instruction cache (ICache) 18 and one or more pipeline stages 20A-20N. The pipeline stages 20A-20N may be coupled in series. The computation engine 10 may include an instruction buffer 22, an X memory 24, a Y memory 26, a Z memory 28, and a compute circuit 30 coupled to each other. In some embodiments, the computation engine 10 may include a cache 32.

The computation engine 10 may be configured to perform one or more computation operations. The computation engine 10 may employ an instruction set, which may be a subset of the instruction set implemented by the processor 12. The processor 12 may recognize instructions implemented by the computation engine 10 and may communicate the instructions to the computation engine 10.

In one embodiment, the computation operations specified by the instructions implemented in the computation engine 10 may be performed on vectors of input operands. For example, an embodiment receives vectors of operands from the X memory 24 and the Y memory 26. The compute circuit 30 may include an array of compute elements (circuits) to perform the operations. Each circuit may receive a vector element from the X memory 24 and a vector element from the Y memory 26, and may evaluate the operation on the vector elements. In an embodiment, the result of the operation may be accumulated with the current value in a corresponding location in the Z memory 28, for write back to the corresponding location in the Z memory 28. In an embodiment, the computation engine 10 may also support a matrix mode for the compute instructions. In the matrix mode, an outer product of the input vector operands may be computed.

In an embodiment, the computation engine 10 may support various data types and data sizes (or precisions). For example, floating point and integer data types may be supported. The floating point data type may include 16 bit, 32 bit, and 64 bit precisions. The integer data types may include 8 bit and 16 bit precisions, and both signed and unsigned integers may be supported. Other embodiments may include a subset of the above precisions, additional precisions, or a subset of the above precisions and additional precisions (e.g. larger or smaller precisions).

The computation circuit 10 may also support one or more instructions for moving results from the Z memory 28 to the X memory 24 and/or Y memory 26, referred to as the extract instructions herein. Additionally, in an embodiment, the extract instructions may support moving data from the X memory 24 to the Y memory 26, and vice versa. Still further, in an embodiment, extract instructions may support moving data from the X memory 24 or the Y memory 26 to the Z memory 28. Any combination of extract instructions may be used, in various embodiments.

More particularly, the extract instructions may move a predetermined amount of data among the memories. The predetermined amount may be the amount of data operated upon by one compute instruction, for example. In an embodiment, the memories 24, 26, and 28 may be arranged as rows (entries) of the predetermined amount, and the extract instructions may move one row of data from a source memory to a target memory. The extract instruction may be coded with addresses that identify the source and target entries (e.g. register numbers, or register addresses). In one embodiment, each entry may be 64 bytes of data which may be 64 eight bit integers, 32 sixteen bit integers, 16 thirty-two bit integers, 32 sixteen bit floating point numbers, 16 thirty-two bit floating point numbers, or 8 sixty-four bit floating point numbers. Other embodiments may support larger or smaller rows.

In one embodiment, the extract instruction may move aligned rows of data (e.g. one row of data, from start to end, may be moved by a given extract instruction). In other embodiments, the source and/or target data may be misaligned and thus the data moved may be sourced from non-overlapping portions of two adjacent rows.

In an embodiment, the instructions executed by the computation engine 10 may also include memory instructions (e.g. load/store instructions). The load instructions may transfer vectors from a system memory (not shown) to the X memory 24, Y Memory 26, or Z memory 28. The store instructions may write the vectors from the X and Y memories 24 and 26 to system memory. The Z memory 28 may be written to memory using the extract instruction to move the results to the X memory 24 and/or the Y memory 26, and then storing the results from the X memory 24 and/or the Y memory 26 to system memory. Alternatively, a store instruction to store the Z memory 28 to main memory may also be supported. The system memory may be a memory accessed at a bottom of the cache hierarchy that includes the caches 14, 16, and 18. The system memory may be formed from a random access memory (RAM) such as various types of dynamic RAM (DRAM) or static RAM (SRAM). A memory controller may be included to interface to the system memory. In an embodiment, the computation engine 10 may be cache coherent with the processor 12. In an embodiment, the computation engine 10 may have access to the data cache 16 to read/write data. Alternatively, the computation engine 10 may have access to the lower level cache 14 instead, and the lower level cache 14 may ensure cache coherency with the data cache 16. In yet another alternative, the computation engine 10 may have access to the memory system, and a coherence point in the memory system may ensure the coherency of the accesses. In yet another alternative, the computation engine 10 may have access to the caches 14 and 16.

In some embodiments, the computation engine 10 may include a cache 32 to store data recently accessed by the computation engine 10. The choice of whether or not to include cache 32 may be based on the effective latency experienced by the computation engine 10 and the desired level of performance for the computation engine 10. The cache 32 may have any capacity, cache line size, and configuration (e.g. set associative, direct mapped, etc.).

In the illustrated embodiment, the processor 12 is responsible for fetching the extract instructions, computation instructions, and memory instructions and transmitting the instructions to the computation engine 10 for execution. The overhead of the "front end" of the processor 12 fetching, decoding, etc. the instructions may be amortized over the computations performed by the computation engine 10. In one embodiment, the processor 12 may be configured to propagate the instructions down the pipeline (illustrated generally in FIG. 1 as stages 20A-20N) to the point at which the instruction becomes non-speculative. In FIG. 1, the stage 20M illustrates the non-speculative stage of the pipeline. From the non-speculative stage, the instruction may be transmitted to the computation engine 10. The processor 12 may then retire the instruction (stage 20N). Particularly, the processor 12 may retire the instruction prior to the computation engine 10 completing the computation (or even prior to starting the computation, if the computation instruction is queued behind other instructions in the instruction buffer 22).

Generally, an instruction may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in the processor 12 and the instruction itself is also known not to cause an exception/speculative flush. Some instructions may be known not to cause exceptions based on the instruction set architecture implemented by the processor 12 and may also not cause speculative flushes. Once the other prior instructions have been determined to be exception-free and flush-free, such instructions are also exception-free and flush-free.

In the case of memory instructions that are to be transmitted to the computation engine 10, the processing in the processor 12 may include translating the virtual address of the memory operation to a physical address (including performing any protection checks and ensuring that the memory instruction has a valid translation).

FIG. 1 illustrates a communication path between the processor 12 (specifically the non-speculative stage 20M) and the computation engine 10. The path may be a dedicated communication path, for example if the computation engine 10 is physically located near the processor 12. The communication path may be shared with other communications, for example a packet-based communication system could be used to transmit memory requests to the system memory and instructions to the computation engine 10. The communication path could also be through system memory, for example the computation engine may have a pointer to a memory region into which the processor 12 may write computation instructions. The computation engine 10 may read the instructions from the memory region. In yet another alternative, the processor 12 may be configured to provide the program counter (PC) address from which to fetch the instruction to the computation engine 10. In still another embodiment, the processor 12 may execute one or more instructions to generate an instruction for the computation engine 10 (e.g. writing the data forming the instruction to a register) and one or more additional instructions to issue the instruction from the register to the computation engine 10.

The instruction buffer 22 may be provided to allow the computation engine 10 to queue instructions while other instructions are being performed. In an embodiment, the instruction buffer 22 may be a first in, first out buffer (FIFO). That is, instructions may be processed in program order. Other embodiments may implement other types of buffers. Other embodiments may implement other types of buffers, multiple buffers for different types of instructions (e.g. load/store instructions versus compute instructions) and/or may permit out of order processing of instructions.

The X memory 24 and the Y memory 26 may each be configured to store at least one vector of input operands. Similarly, the Z memory 28 may be configured to store at least one computation result. The result may be an array of results at the result size (e.g. 16 bit elements or 32 bit elements). In some embodiments, the X memory 24 and the Y memory 26 may be configured to store multiple vectors and/or the Z memory 28 may be configured to store multiple result vectors. Each vector may be stored in a different bank in the memories, and operands for a given instruction may be identified by bank number. More generally, each entry in the memories 24, 26, and 28 may be addressed by a register address (e.g. register number) and thus the entries in the memories may be viewed as registers, similar to an integer or floating point register in the processor 12 (although generally significantly larger than such a register in terms of storage capacity). Viewed in another way, each of the memories 24, 26, and 28 may be addressable as entries using addresses that are referenced to the particular memory (e.g. each memory 24, 26, and 28 may have its own address space). A given address of a given entry in the X memory 24, for example, may have the same numerical value as a second given address of a second given entry in the Y memory 26. Because they are coded in a given instruction as an X memory address or a Y memory address, the correct entry from the correct memory to be read/written may be selected by the computation engine 10.

The processor 12 fetches instructions from the instruction cache (ICache) 18 and processes the instructions through the various pipeline stages 20A-20N. The pipeline is generalized, and may include any level of complexity and performance enhancing features in various embodiments. For example, the processor 12 may be superscalar and one or more pipeline stages may be configured to process multiple instructions at once. The pipeline may vary in length for different types of instructions (e.g. ALU instructions may have schedule, execute, and writeback stages while memory instructions may have schedule, address generation, translation/cache access, data forwarding, and miss processing stages). Stages may include branch prediction, register renaming, prefetching, etc.

Generally, there may be a point in the processing of each instruction at which the instruction becomes non-speculative. The pipeline stage 20M may represent this stage for computation instructions, which are transmitted from the non-speculative stage to the computation engine 10. The retirement stage 20N may represent the state at which a given instruction's results are committed to architectural state and can no longer by "undone" by flushing the instruction or reissuing the instruction. The instruction itself exits the processor at the retirement stage, in terms of the presently-executing instructions (e.g. the instruction may still be stored in the instruction cache). Thus, in the illustrated embodiment, retirement of compute engine instructions occurs when the instruction has been successfully transmitted to the computation engine 10.

The instruction cache 18 and data cache (DCache) 16 may each be a cache having any desired capacity, cache line size, and configuration. Similarly, the lower level cache 14 may be any capacity, cache line size, and configuration. The lower level cache 14 may be any level in the cache hierarchy (e.g. the last level cache (LLC) for the processor 12, or any intermediate cache level).

Figure 2:
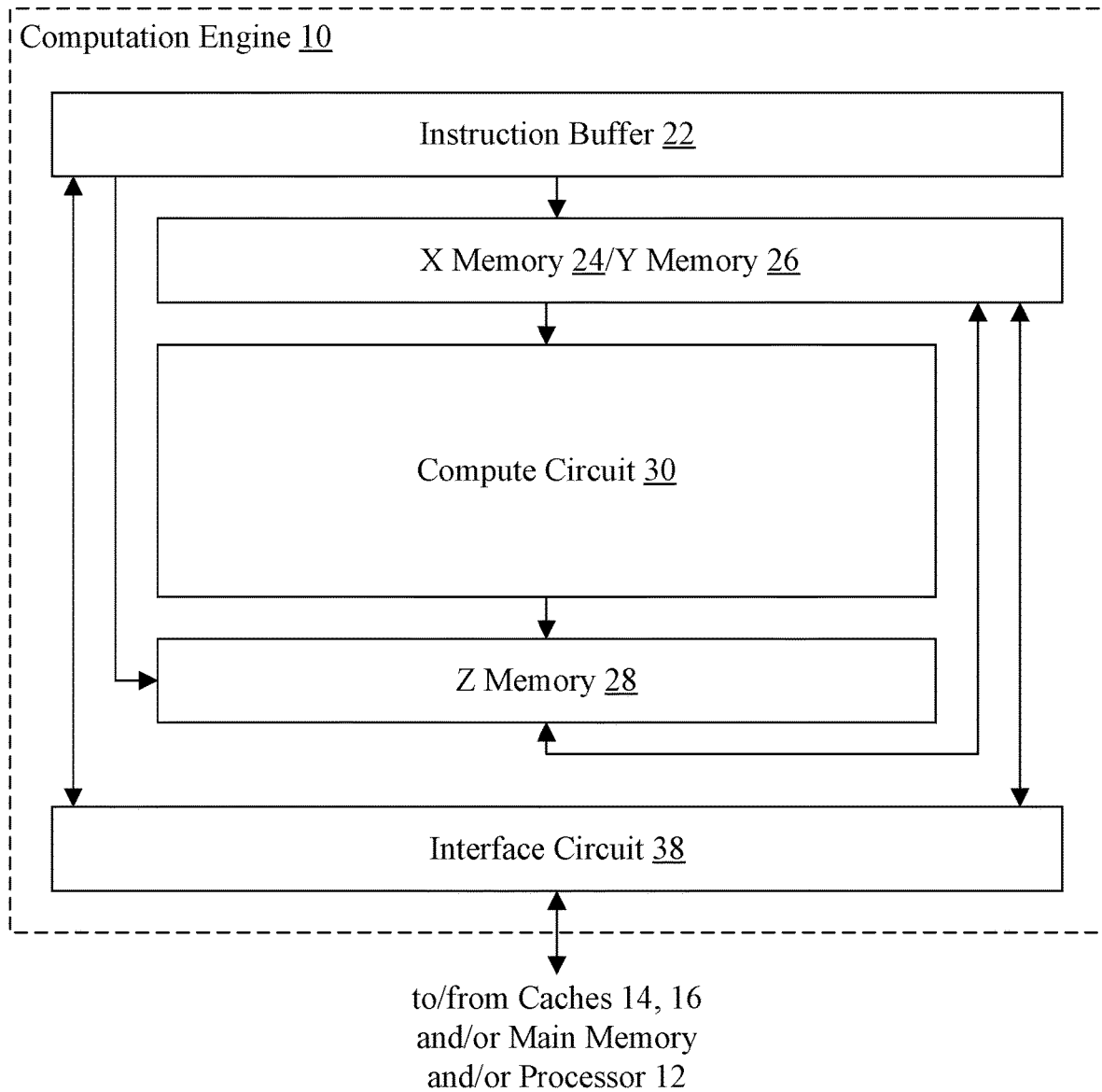
FIG. 2 is a block diagram illustrating one embodiment of the computation engine in greater detail.

Turning now to FIG. 2, a block diagram of one embodiment of the computation engine 10 in greater detail is shown. The instruction buffer 22, the X memory 24, the Y Memory 26, the compute circuit 30, and the Z memory 28 are shown. Additionally, an interface circuit 38 is shown. The instruction buffer 22 is coupled to the X, Y and Z memories 24, 26 and 28, and the interface circuit 38. The X and Y memories 24 and 26 are coupled to the interface circuit 38 and the compute circuit 30. The compute circuit 30 is further coupled to the Z memory 28, which is coupled to the X and Y memories 24 and 26 and the interface circuit 28.

The instruction buffer 22 may receive instructions via the interface circuit 38 and may communicate on the interface controlled by the interface circuit 38 to indicate acceptance of instructions, requests for instructions, etc., depending on the definition of the interface. The instruction buffer 22 may schedule instructions for execution and transmit the scheduled instructions into the pipeline of the computation engine 10. For example, instructions which read operands from the X memory 24 and/or the Y memory 26 may be transmitted to the memories (or identifiers selecting locations in the X memory 24 and/or the Y memory 26, such as addresses, may be transmitted). The instruction and operands may be provided to the compute circuit 30, which may perform the computation on and provide a result vector to the Z memory 28 (e.g. to be written at an address in the Z memory 28 specified by the instruction).

In an embodiment, the instruction buffer 22 may also issue the extract instructions through the X memory 24/Y memory 26 and the compute circuit 30 to the Z memory 28. The extract instructions that use the Z memory 28 as a source may operate as a noop flowing through the X memory 24/Y memory 26 and the computer circuit 30. At the Z memory 28, the computation engine 30 may read the output vector from the addressed entry of the Z memory 28 and may provide the output vector to the X memory 24 or the Y memory 26 specified as the target memory of the extract instruction. The result may be written to the targeted entry. Alternatively, as illustrated in FIG. 2, the instruction buffer 22 may issue the extract instruction directly to the Z memory 28 and without flowing throw the X memory 24/Y memory 26 and the compute circuit 30.

Similarly the extract instructions that use the X memory 24/Y memory 26 as a source may be provided to the X memory 24/Y memory 26, which may read the addressed entry and provide a vector which may flow through the compute circuit 30 as a noop (or bypass the computer circuit 30) and may write the Z memory 28 or, if the target is the other X memory 24/Y memory 26, may pass through the Z memory 28 as a noop and return to the X memory 24/Y memory 26 to be written to the targeted entry.

Figure 3:
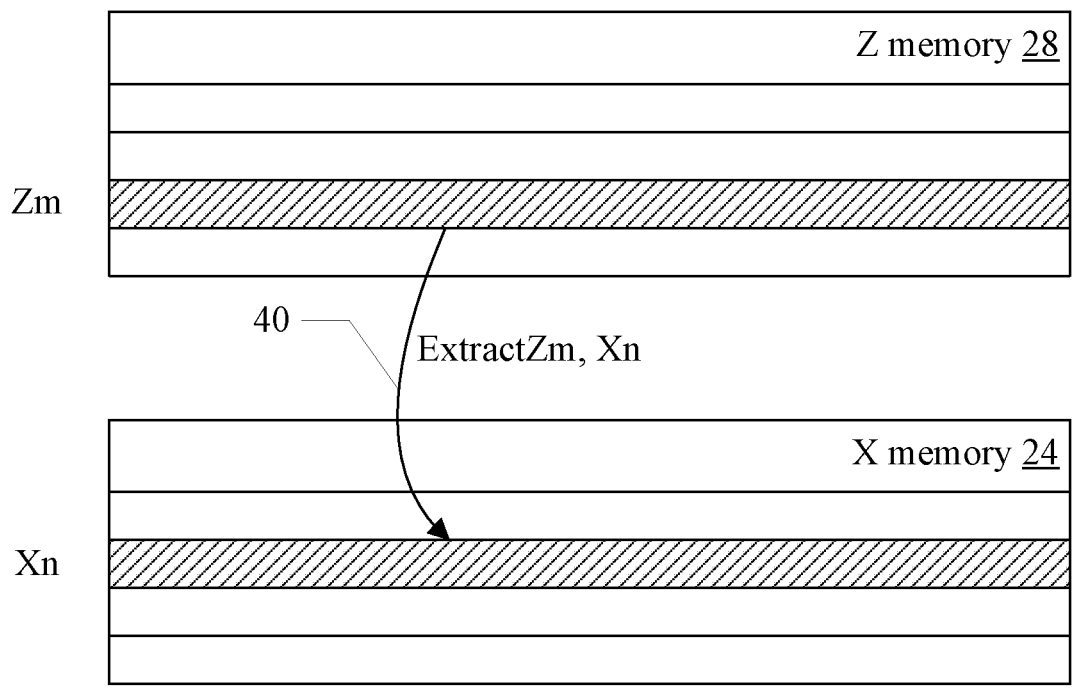
FIG. 3 is a block diagram illustrating one embodiment of an extract instruction.

FIG. 3 is a block diagram illustrating operation of an embodiment of an extractZ instruction, which extracts a row (entry) of the Z memory 28 to the X memory 24. A similar operation may occur to extract Z memory 28 to Y memory 26. The extract instruction may be coded with a Z address (Zm) and an X address (Xn) identifying source and target entries in the memories for the data. The "m" and "n" postfixes are used to indicate that different source and target rows may be specified in general (i.e. "m" need not equal "n," although "m"="n" is supported). The data is illustrated as a crosshatched row in FIG. 3, and the arrow 40 illustrates the movement of the data from the row Zm to the row Xn. It is noted that, in the context of the extract instruction, the movement of data may refer to copying the data from the source to the target. The data also remains stored in the source after the extract instruction has been executed.

Figure 4:
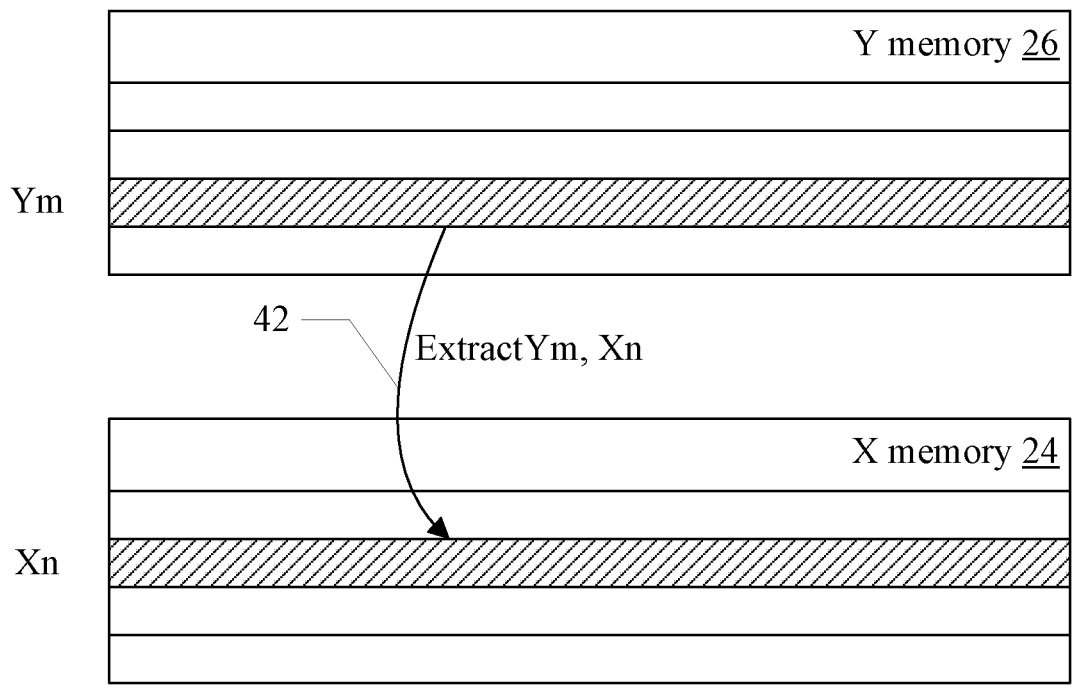
FIG. 4 is a block diagram illustrating one embodiment of a second extract instruction.

FIG. 4 is a block diagram illustrating operation of an embodiment of an extractY instruction, which extracts a row (entry) of the Y memory 26 to the X memory 24. A similar operation may occur to extract X memory 24 to Y memory 26, for an extractX instruction. Additionally, extractX and extractY instructions that target Z memory entries may also be supported. The extract instruction may be coded with a Y address (Ym) and an X address (Xn) identifying source and target entries in the memories for the data. The data is illustrated as a crosshatched row in FIG. 4, and the arrow 42 illustrates the movement of the data from the row Ym to the row Xn.

The extract instructions may provide a flexible mechanism to move data between the X, Y, and Z memories 24, 26, and 28. With the extract instructions, certain workloads may be efficiently handled within the computation engine 10, reducing the amount of communication with the main memory. Since the main memory latency may not be experienced as frequently, performance may be relatively higher.

Additionally, the power consumption for movement between the memories 24, 26, and 28 may be significantly lower (e.g. orders of magnitude) than movement of date between the main memory and one or more of the memories 24, 26, and 28.

For example, in one type of workload a vector set may be applied to another vector set, and then applied again to results of the first application as computation continues. One vector set could be loaded into the X memory 24, for example, and the other initial vector set could be loaded in the Y memory 26. Computations may be performed, accumulating results in the Z memory 28. Then, the extract instructions may be used to move the results from the Z memory 28 (or a portion of the Z memory 28) to the Y memory 26. Additional computations may be performed on the X memory 24 and the Y memory 26 (with the Z memory results stored there by executing the extractZ instruction), accumulating additional results in the Z memory 28, without requiring data to be read from the main memory. Moving results from Z memory 28 to the Y memory 26 (or X memory 24) may be desirable, for example, if computations are to be performed with more than one element of Z as input to a given computation (e.g. Z elements are to be multiplied together).

Figure 5:
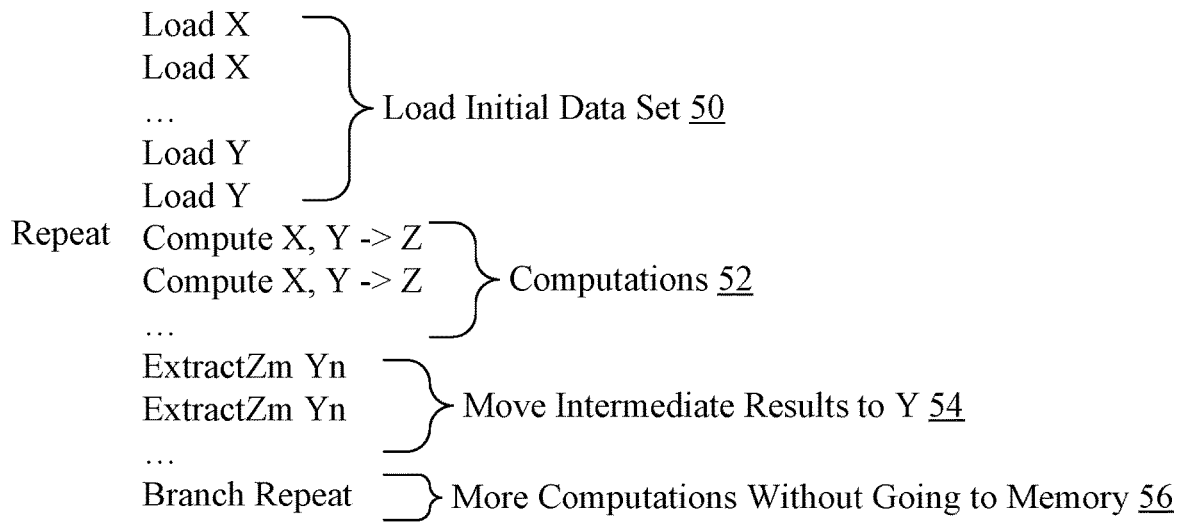
FIG. 5 is a first example use case of the extract instructions.

FIG. 5 is a diagram illustrating a code sequence similar to the above example. In FIG. 5, load instructions may be used to load initial data into the X memory 24 and the Y memory 26 (reference numeral 50). The data may be transferred from the main memory system. In some embodiments, if the computation engine 10 has access to the DCache 16 or the lower level cache 14 (or other caches in the main memory system), the data may be read from cache. The code sequence may then include various compute instructions which cause the computation engine 10 to perform computations on data from the X and Y memories 24 and 26, and write results to the Z memory 28 (and further may include accumulate results with the current contents of the Z memory 28) (reference numeral 52). The compute instructions may include integer multiply-accumulate (MAC) instructions, floating point multiply-accumulate instructions (e.g. fused multiply add (FMA) and/or fused multiply subtract (FMS)), etc. in various embodiments. Extract instructions may be used to move intermediate results from Z to Y (reference numeral 54), and then additional computations on X and Y, accumulated in Z may be performed (reference numeral 56). In this example, a branch instruction is used to return to the compute instructions 52 (illustrated via the Repeat label in FIG. 5). Other embodiments may include additional compute instructions in the code sequence instead. In an embodiment, the branch instruction may be executed within the processor 12.

Figure 6:
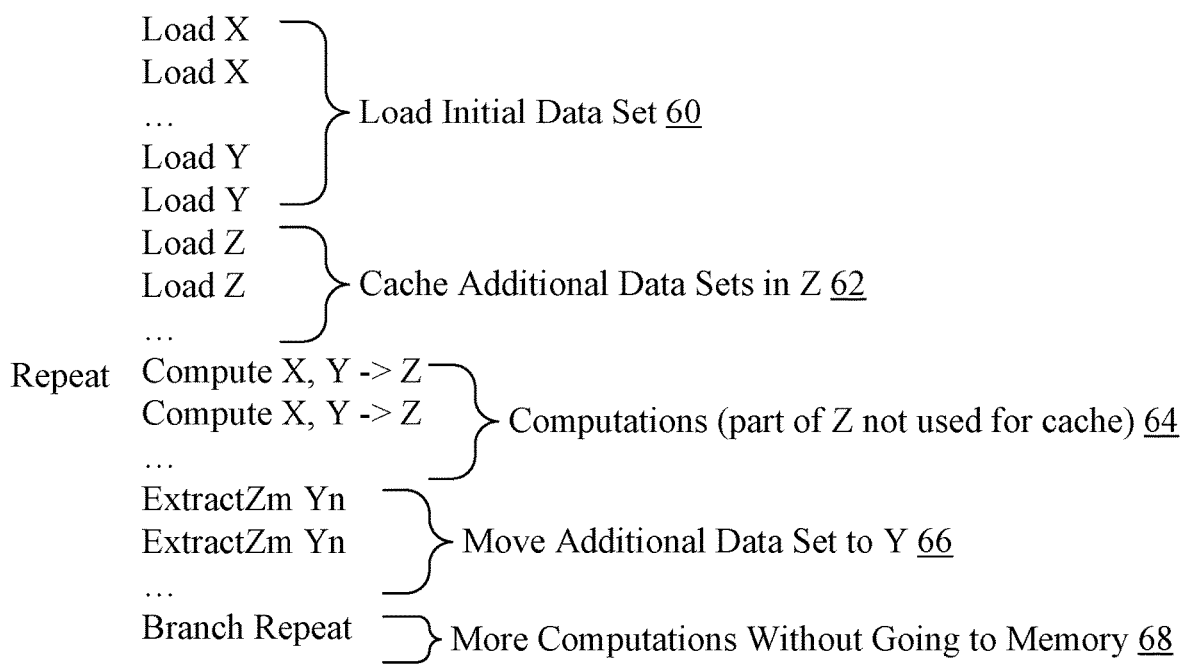
FIG. 6 is a second example use case of the extract instructions.

In another example, if computational footprint of the operation being performed does not occupy all of the Z memory 28, the unused portion of the Z memory 28 may be used to cache data that will later be placed in the X and/or Y memories to continue operation. FIG. 6 is a diagram of a code sequence illustrating such an example. In FIG. 6, the code may initialize the X and Y memories with the initial data set to be operated upon (reference numeral 60), and additional data may be loaded into the Z memory 28 as well (reference numeral 62). Computations on the initial data set in the X and Y memories 24 and 26 may be performed, accumulating results in the Z memory 28 (reference numeral 64). The portion of the Z memory 28 that is used as a target for the compute instructions may not overlap with the portion being used as the cache. Once the initial computations are complete, ExtractZ instructions may be used to move the cached data into the Y memory 26, in this example (reference numeral 66). In other cases, the X memory 24 may receive the cached data, or both the X and Y memories 24 and 26 may receive the cache data via ExtractZ instructions. The code sequence may perform more computations using the cache data (reference numeral 68). As with the example of FIG. 5, the example of FIG. 6 includes a branch to the compute instructions 64 to perform additional computations, although other embodiments may include additional compute instructions in the code sequence instead of the branch, as desired.

FIG. 7 is a table 90 illustrating an exemplary instruction set for one embodiment of the computation engine 10. Other embodiments may implement any set of instructions, including subsets of the illustrated set, other instructions, a combination of subsets and other instructions, etc.

The memory operations for the computation engine 10 may include load and store instructions. Specifically, in the illustrated embodiment, there are load and store instructions for the X, Y, and Z memories, respectively. In an embodiment, the X, Y, and Z memories may have multiple banks for storing different vectors. In such an embodiment, there may be multiple instructions to read/write the different banks or there may be an operand specifying the bank affected by the load/store instructions. In each case, an X memory bank may store a pointer to memory from/to which the load/store is performed. The pointer may be virtual and may be translated by the processor 12 as discussed above. Alternatively, the pointer may be physical and may be provided by the processor 12 post-translation.

In addition to the load and store instructions, the extract instructions may be used to move the data between the X, Y, and Z memories. The extractZ instruction may move data from rows of the Z memory 28 to rows of the X or Y memory 24 or 26. The extractX instruction may move data from the X memory to the Y memory, and the extractY instruction may move data from the Y memory to the X memory. In other embodiments, an extractX or extractY instruction may be coded to move data to the Z memory 28.

The compute instructions may perform a computation on the vector elements in the X and Y memory entries addressed by X RA and Y RA, respectively, storing the result in the Z memory entry addresses by the Z RA (and possibly accumulating the result with the current value in the Z memory entry). As mentioned previously, the compute instructions may include MAC, FMA, and FMS. The compute instructions may also operate in a matrix mode, multiplying vector elements to produce a matrix output (e.g. an outer product). The matrix/vector mode for a given instruction may be coded as the V/M field of the compute instructions.

Figure 8:
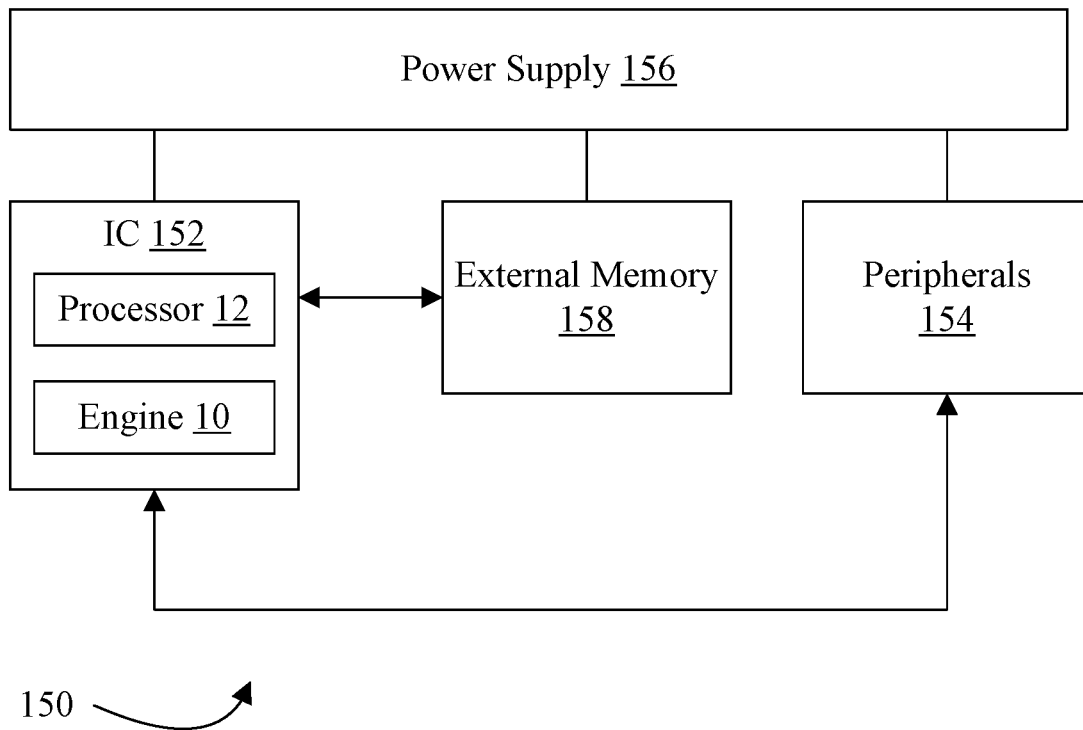
FIG. 8 is a block diagram of one embodiment of a system.

FIG. 8 is a block diagram of one embodiment of a system 150. In the illustrated embodiment, the system 150 includes at least one instance of an integrated circuit (IC) 152 coupled to one or more peripherals 154 and an external memory 158. A power supply 156 is provided which supplies the supply voltages to the IC 152 as well as one or more supply voltages to the memory 158 and/or the peripherals 154. The IC 152 may include one or more instances of the processor 12 and one or more instances of the computation engine 10. In other embodiments, multiple ICs may be provided with instances of the processor 12 and/or the computation engine 10 on them.

The peripherals 154 may include any desired circuitry, depending on the type of system 150. For example, in one embodiment, the system 150 may be a computing device (e.g., personal computer, laptop computer, etc.), a mobile device (e.g., personal digital assistant (PDA), smart phone, tablet, etc.), or an application specific computing device capable of benefiting from the computation engine 10 (e.g., neural networks, LSTM networks, other machine learning engines including devices that implement machine learning, etc.). In various embodiments of the system 150, the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 152 in a chip-on-chip or package-on-package implementation.

In an embodiment, the code sequences shown in FIGS. 5 and/or 6 may be stored in the external memory 158 for execution (and may be cached in the processor caches of the processor 12, as mentioned previously).

Figure 9:
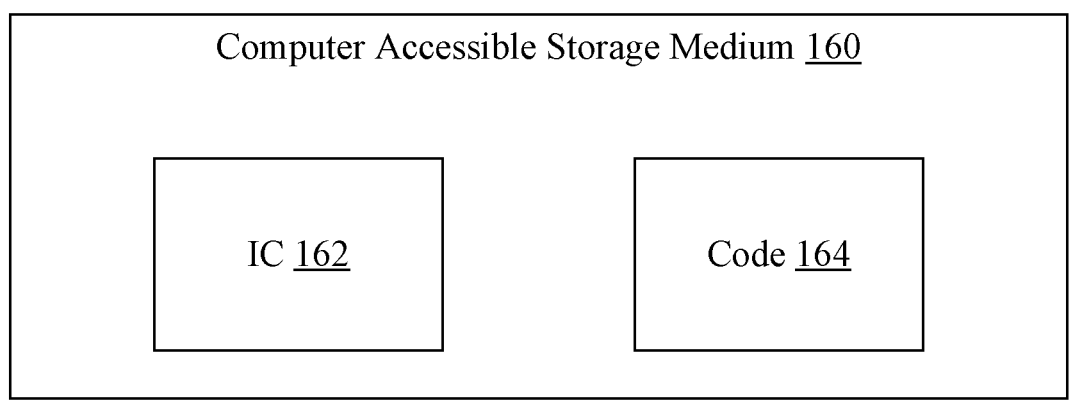
FIG. 9 is a block diagram of one embodiment of a computer accessible storage medium.

FIG. 9 is a block diagram of one embodiment of a computer accessible storage medium 160 is shown storing an electronic description of the IC 152 (reference numeral 162) and/or one or more code sequences 164. More particularly, the description may include at least the computation engine 10 and/or the processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the IC 152 stored on the computer accessible storage medium 160 may be a database which can be read by a program and used, directly or indirectly, to fabricate the hardware comprising the IC 152. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 152. The netlist may then be placed and routed to produce a data set describing geometric shapes to be applied to masks. The masks may then be used in various semiconductor fabrication steps to produce a semiconductor circuit or circuits corresponding to the IC 152. Alternatively, the description 162 on the computer accessible storage medium 300 may be the netlist (with or without the synthesis library) or the data set, as desired.

The code sequences 164 may include code sequences similar to the examples of FIGS. 5 and/or 6, in an embodiment.

While the computer accessible storage medium 160 stores a description 162 of the IC 152, other embodiments may store a description 162 of any portion of the IC 152, as desired (e.g. the computation engine 10 and/or the processor 12, as mentioned above).

Numerous variations and modifications will become apparent to those skilled in the art once the above disclosure is fully appreciated. It is intended that the following claims be interpreted to embrace all such variations and modifications.

What is claimed is:

1. A system comprising:
a processor configured to execute a first one or more instructions to generate a second instruction for execution by a computation engine and to further execute a third one or more instructions to issue the second instruction to the computation engine;
the computation engine coupled to the processor, wherein:
the computation engine comprises:
a first memory storing, during use, a plurality of input vectors that are sources for computations performed by the computation engine in response to compute instructions issued to the computation engine by the processor, and wherein, for the compute instructions, the first memory is used only for sources, and
a second memory storing a plurality of output vectors, during use, that are results generated by the computation engine in response to the compute instructions, during use, and wherein, for the compute instructions, the second memory is an only target for results, wherein a given entry in the second memory is selected for the results of a given compute instruction via a value coded into the given compute instruction;
the first memory is addressable using a first address coded into the second instruction and the second memory is addressable using a second address coded into the second instruction; and
the computation engine, in response to executing the second instruction, is configured to move data from a source entry in one of the first memory and the second memory to a target entry in another one of the first memory and the second memory, and wherein the second instruction causes only data movement from the source entry to the target entry.

2. The system as recited in claim 1 wherein the second instruction is coded with a source address of the source entry and a target address of the target entry.

3. The system as recited in claim 2 wherein the source entry is in the second memory.

4. The system as recited in claim 3 wherein the first memory comprises a first plurality of entries and the second memory comprises a second plurality of entries, and wherein the source address identifies the source entry in the second plurality of entries and the target address identifies the target entry in the first plurality of entries.

5. The system as recited in claim 1 further comprising a third memory storing, during use, a second plurality of input vectors, and wherein the computation engine is configured to move data from a second source entry in the third memory to a second target entry in the first memory responsive to a fourth instruction from the processor.

6. The system as recited in claim 5 wherein the fourth instruction is coded with a second source address of the second source entry and a second target address of the second target entry.

7. The system as recited in claim 1 wherein the second instruction is stored in a register in the processor subsequent to execution of the one or more first instructions and the second instruction is issued from the register to the computation engine.

8. A computation engine comprising:
an input memory storing one or more input vectors;
an output memory storing one or more output vectors;
a compute circuit coupled to the input memory and the output memory, wherein the compute circuit is configured to perform computations on input vector elements from the input memory to generate output vector elements for the output memory in response to compute instructions, wherein compute instructions only target the output memory for the output vector elements and only specify the input memory for the input vector elements, wherein a given entry in the output memory is selected for the results of a given compute instruction via a value coded into the given compute instruction; and
in response to an extract instruction, the computation engine is configured to move an output vector from a first entry in the output memory that is specified by the extract instruction to a second entry in the input memory that is specified by the extract instruction, wherein the extract instruction is assembled by a processor coupled to the computation engine via execution of one or more first instructions on the processor and the extract instruction is issued to the computation engine via execution of one or more second instructions on the processor.

9. The computation engine as recited in claim 8 wherein the extract instruction is coded with a first address of the first entry and a second address of the second entry.

10. The computation engine as recited in claim 9 wherein the input memory comprises a first plurality of entries and the output memory comprises a second plurality of entries, and wherein the first address identifies the first entry in the second plurality of entries and the second address identifies the second entry in the first plurality of entries.

11. The computation engine as recited in claim 8 further comprising a second input memory storing, during use, one or more second input vectors, and wherein the computation engine is configured to move data from a third entry in the second input memory to a fourth entry in the input memory responsive to a second instruction.

12. A non-transitory computer accessible storage medium storing a plurality of instructions which, when executed in a computation engine:
compute a first plurality of results in the computation engine responsive to data in an input memory in the computation engine and write the results to an output memory of the computation engine, wherein, for computations performed by the computation engine, the output memory is an only target for the results of the computations, wherein a given entry in the output memory is selected for the results of a given compute instruction via a value coded into the given compute instruction;
move the first plurality of results from the output memory to the input memory in the computation engine; and
compute a second plurality of results in the computation engine responsive to the first plurality of results in the input memory, wherein the plurality of instructions are assembled by a processor coupled to the computation engine via execution of one or more first instructions in the processor and are issued to the computation engine via execution of one or more second instructions in the processor.

13. The non-transitory computer accessible storage medium as recited in claim 12 wherein the output memory includes a plurality of entries, and wherein the plurality of instructions which, when executed, move the first plurality of results comprise a plurality of first instructions, each of the plurality of first instructions coded to move result data stored in a respective entry of the plurality of entries to the output memory.

14. The non-transitory computer accessible storage medium as recited in claim 13 wherein each of the plurality of first instructions is coded to move data to a second respective entry of a second plurality of entries in the input memory.

15. The non-transitory computer accessible storage medium as recited in claim 12 wherein computing the second plurality of results is performed by re-executing the plurality of instructions which compute the first plurality of results.

16. The non-transitory computer accessible storage medium as recited in claim 15 wherein the re-executing is responsive to a branch instruction, wherein the branch instruction is executed in a processor separate from the computation engine.

17. The non-transitory computer accessible storage medium as recited in claim 12 wherein the plurality of instructions, when executed:
load first input data into the input memory;
load second input data into the output memory, caching the second input data in the output memory;
compute a third plurality of results using the first input data, and writing the third plurality of results in the output memory;
move the second input data from the output memory to the input memory; and
compute a fourth plurality of results using the second input data.

18. The non-transitory computer accessible storage medium as recited in claim 17 wherein the third plurality of results are stored in the output memory in locations separate from locations in the output memory that store the second input data.

19. The non-transitory computer accessible storage medium as recited in claim 17 wherein computing the fourth plurality of results is performed by re-executing the plurality of instructions which compute the third plurality of results.

20. The non-transitory computer accessible storage medium as recited in claim 19 wherein the re-executing is responsive to a branch instruction, wherein the branch instruction is executed in a processor separate from the computation engine.

21. A system comprising:
a main memory system;
a processor coupled to the main memory system and configured to fetch a first instruction and a load/store instruction for execution by a computation engine and to transmit the first instruction and the load/store instruction to the computation engine; and
the computation engine coupled to the processor and the main memory system, wherein:
the computation engine comprises:
a first local memory storing, during use, a plurality of input vectors that are sources for computations performed by the computation engine in response to compute instructions issued to the computation engine by the processor, and wherein, for the compute instructions, the first local memory is used only for sources, and
a second local memory storing a plurality of output vectors, during use, that are results generated by the computation engine in response to the compute instructions, during use, and wherein, for the compute instructions, the second local memory is an only target for results, wherein a given entry in the second memory is selected for the results of a given compute instruction via a value coded into the given compute instruction;
the computation engine, in response to executing the first instruction, is configured to move data from a source entry in one of the first local memory and the second local memory to a target entry in another one of the first local memory and the second local memory, and wherein the first instruction causes only data movement from the source entry to the target entry; and
the computation engine is configured to move data between the main memory system and one of the first local memory and the second local memory in response to executing the load/store instruction.

22. The system as recited in claim 21 wherein the first instruction is coded with a source address of the source entry and a target address of the target entry.

23. The system as recited in claim 22 wherein the first local memory comprises a first plurality of entries and the second local memory comprises a second plurality of entries, and wherein the source address identifies the source entry in the second plurality of entries and the target address identifies the target entry in the first plurality of entries.

24. The system as recited in claim 21 further comprising a third local memory storing, during use, a second plurality of input vectors, and wherein the computation engine is configured to move data from a second source entry in the third local memory to a second target entry in the first local memory responsive to a second instruction from the processor.

25. A computation engine comprising:
an input memory storing one or more input vectors;
an output memory storing one or more output vectors;
a compute circuit coupled to the input memory and the output memory, wherein the compute circuit is configured to perform computations on input vector elements from the input memory to generate output vector elements for output memory in response to compute instructions, wherein compute instructions only target the output memory for the output vector elements and only specify the input memory for the input vector elements, and wherein a given entry in the output memory is selected for the results of a given compute instruction via a value coded into the given compute instruction;
in response to an extract instruction, the computation engine is configured to move an output vector from a first entry in the output memory that is specified by the extract instruction to a second entry in the input memory that is specified by the extract instruction; and
in response to a load/store instruction, the computation engine is configured to move data between a main memory system and one of the input memory and the output memory.

26. The computation engine as recited in claim 25 wherein the extract instruction is coded with a first address of the first entry and a second address of the second entry.

* * * * *